US012776016B2

(12) United States Patent
Sun

(10) Patent No.: US 12,776,016 B2
(45) Date of Patent: Oct. 27, 2026

(54) IMAGE CORRECTION METHOD AND SYSTEM

(71) Applicant: HYUNDAI MOBIS CO., LTD., Seoul (KR)

(72) Inventor: In Sun Sun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 375 days.

(21) Appl. No.: 18/455,594

(22) Filed: Aug. 24, 2023

(65) Prior Publication Data

US 2024/0144450 A1 May 2, 2024

(30) Foreign Application Priority Data

Oct. 28, 2022 (KR) ........................ 10-2022-0141437

(51) Int. Cl.

*G06T 5/80* (2024.01)
*G06T 5/50* (2006.01)
*G06T 7/246* (2017.01)

(52) U.S. Cl.

CPC .................. *G06T 5/80* (2024.01); *G06T 5/50* (2013.01); *G06T 7/248* (2017.01); *G06T 2207/20016* (2013.01); *G06T 2207/30256* (2013.01)

(58) Field of Classification Search

CPC .. G06T 5/80; G06T 5/50; G06T 7/248; G06T 2207/20016; G06T 2207/30256; G06T 2207/10016; G06T 2207/30252; G06T 7/80; G06T 7/246; G06T 5/00; G06T 7/0004; G06T 7/20; G06T 7/73; G06V 10/40

See application file for complete search history.

(56) References Cited

U.S. PATENT DOCUMENTS

2009/0175497 A1* 7/2009 Anai ......................... G06T 7/74 382/103
2010/0322476 A1* 12/2010 Kanhere .............. G06V 10/763 382/103
2021/0158081 A1* 5/2021 Devitt .................. G06V 10/751
2022/0189065 A1* 6/2022 Kawabe ............... H04N 9/8205

FOREIGN PATENT DOCUMENTS

JP 6035620 B2 * 11/2016 ............... G06T 7/85
KR 10-2016-0013337 2/2016
WO WO-2020258936 A1 * 12/2020 ............. G06V 20/10

* cited by examiner

*Primary Examiner* — Edward Park
*Assistant Examiner* — Alexander Joseph Vaughn
(74) *Attorney, Agent, or Firm* — DLA PIPER LLP US

(57) ABSTRACT

An image correction method and system. The image correction method includes collecting a plurality of images captured at different time points by an imaging device installed in a vehicle, determining a plurality of feature points in a first image captured at a first time point among the plurality of images, detecting corresponding points respectively matching the plurality of feature points in a second image captured at a second time point following the first time point among the plurality of images, determining movement information of the plurality of feature points based on the plurality of feature points and a result of detecting, determining a correction parameter based on the movement information, and performing image correction based on the correction parameter.

15 Claims, 3 Drawing Sheets

IMAGE CORRECTION METHOD AND SYSTEM

CROSS REFERENCE TO RELATED APPLICATION

The present application claims priority to Korean Patent Application No. 10-2022-0141437, filed Oct. 28, 2022, the entire contents of which is incorporated herein for all purposes by this reference.

TECHNICAL FIELD

The present disclosure relates to an image correction method and system capable of correcting an offset of an imaging device installed in a vehicle even while the vehicle is in motion.

BACKGROUND

With recent advancements in various sensors and recognition systems, the commercialization of Advanced Driver Assistance Systems (ADAS) is actively taking place in vehicles, considering the convenience and safety of drivers.

In particular, imaging devices (e.g., cameras) are installed to capture the surroundings of the vehicle from various angles to widen the driver's field of vision, and the images captured by the imaging devices can be viewed through the cluster or display provided in the vehicle. The driver can use the captured images to deal with the areas that are difficult to see with the naked eye.

To ensure that the images captured by the imaging devices installed on a vehicle are free from distortion caused by any positional offset, an image correction process is carried out before the vehicle's delivery. To perform image correction, a floor pattern with known locations is required in advance, and the imaging device installed in the vehicle captures this pattern to obtain image information for the correction process. Therefore, the image correction process to compensate for distortion caused by any offset of the imaging devices is presently limited to special conditions such as factories equipped with a patterned ground with known positions.

Meanwhile, during the use of the vehicle, the position of the imaging device may vary compared to its original installation position due to external factors (e.g., external impacts or replacement of the imaging device). As a result, the images captured by the imaging devices may have errors or distortions compared to the corrected images based on the original mounting position, and there is a problem where the image correction process needs to be performed again based on the imaging device that has experienced a change in position due to external factors. Furthermore, in order to perform image correction, the driver may need to move to a location with the special conditions as mentioned earlier, which can be burdensome and lead to time and space constraints in correcting the images captured by the imaging device affected by position changes.

The foregoing is intended merely to aid in the understanding of the background of the present disclosure, and is not intended to mean that the present disclosure falls within the purview of the related art that is already known to those skilled in the art.

SUMMARY

The present disclosure has been provide to achieve the above objects and aims to provide an image correction method and system capable of correcting the offset of the imaging device based on the ground feature points obtained through the imaging device while the vehicle is in motion.

The technical objects of the present disclosure are not limited to the aforesaid, and other objects not described herein with be clearly understood by those skilled in the art from the descriptions below.

In order to accomplish the above objects, an image correction method according to the present disclosure includes collecting a plurality of images captured at different time points by an imaging device installed in a vehicle, determining a plurality of feature points in a first image captured at a first time point among the plurality of images, detecting corresponding points respectively matching the plurality of feature points in a second image captured at a second time point following the first time point among the plurality of images, determining movement information of the plurality of feature points based on the plurality of feature points and a result of detecting, determining a correction parameter based on the movement information, and performing image correction based on the correction parameter.

For example, collecting the plurality of images may include transforming the plurality of images captured at different time points into pyramid images or partial images showing parts thereof.

For example, determining the plurality of feature points may include determining the plurality of feature points using at least one of a crack and a pattern appearing on a road surface contained in the first image.

For example, detecting the corresponding points may include detecting a corresponding point for each of the plurality of feature points until a predetermined number of corresponding points are detected in the second image.

For example, detecting the corresponding points may include collecting at least one of the vehicle speed and steering information as vehicle information and detecting a corresponding point for each of the plurality of feature points in the second image captured at the second time point based on the collected vehicle information.

The image correction method may further include determining the movement information of the plurality of feature points based on the detection result of the corresponding points and the plurality of feature points.

For example, determining the movement information may determine, in response to a number of corresponding points detected in the second image being equal to or greater than a predetermined number, the movement information based on coordinates of feature points respectively matching the detected corresponding points among the plurality of feature points and coordinates of the detected corresponding points.

For example, determining the movement information may include determining a motion vector using pairs of the coordinates of the feature points respectively matching the plurality of detected corresponding points and the coordinates of the plurality of detected corresponding points and determine the movement information of the plurality of feature points based on the motion vector.

For example, determining the correction parameter may include deriving a homography based on the movement information and determining the correction parameter using a component of the derived homography.

In addition, in order to accomplish the above objects, an image correction system according to the present disclosure may include an imaging device adapted to be installed in a vehicle, and a first controller configured to collect a plurality of images captured at different time points by the imaging device, determine a plurality of feature points in a first image captured at a first time point among the plurality of images, detect corresponding points respectively matching the plurality of feature points in a second image captured at a second time point following the first time point among the plurality of images, determine movement information of the plurality of feature points based on the plurality of feature points and a result of detecting corresponding points, determine a correction parameter based on the movement information, and perform image correction based on the correction parameter.

For example, the first controller may transform the plurality of images captured at different time points into pyramid images or partial images showing parts thereof.

For example, the first controller may determine the plurality of feature points using at least one of a crack and a pattern appearing on a road surface contained in the first image.

For example, the first controller may detect a corresponding point for each of the plurality of feature points until a predetermined number of corresponding points are detected in the second image.

For example, the image correction system may further include a second controller collecting at least one of vehicle speed and steering information as vehicle information, wherein the first controller may detect a corresponding point for each of the plurality of feature points in the second image captured at the second time point based on the collected vehicle information.

For example, the first controller may determine, in response to a number of corresponding points detected in the second image being equal to or greater than a predetermined number, the movement information based on coordinates of feature points respectively matching the detected corresponding points among the plurality of feature points and coordinates of the detected corresponding points.

For example, the first controller may determine a motion vector using pairs of the coordinates of the feature points respectively matching the plurality of detected corresponding points and the coordinates of the plurality of detected corresponding points, and determine the movement information of the plurality of feature points based on the motion vector.

For example, the first controller may derive a homography based on the movement information and determine the correction parameter using a component of the derived homography.

The image correction method and system of the present disclosure can perform image correction on the imaging device's offset caused by external factors, without any time or space constraints, by utilizing the image information obtained through the imaging device while the vehicle is in motion.

Furthermore, by performing image correction based on the image information obtained through the imaging device without any time or space constraints, it is possible to provide the driver with image information of high consistency even when there is an offset in the imaging device.

The advantages of the present disclosure are not limited to the aforesaid, and other advantages not described herein may be clearly understood by those skilled in the art from the descriptions below.

DETAILED DESCRIPTION

In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as “first” and “second” can be used to describe various components without limiting the components. The terms are used only for distinguishing one component from another component.

It will be understood that when a component is referred to as being “connected to” or “coupled to” another component, it can be directly connected or coupled to the other component or intervening component may be present. In contrast, when a component is referred to as being “directly connected to” or “directly coupled to” another component, there are no intervening component present.

As used herein, the singular forms are intended to include the plural forms as well, unless the context clearly indicates otherwise.

It will be further understood that the terms “comprises” or “has,” when used in this specification, specify the presence of a stated feature, number, step, operation, component, element, or a combination thereof, but they do not preclude the presence or addition of one or more other features, numbers, steps, operations, components, elements, or combinations thereof.

Hereinafter, descriptions are made of the embodiments disclosed in the present specification with reference to the accompanying drawings in which the same reference numbers are assigned to refer to the same or like components and redundant description thereof is omitted.

In addition, it should be noted that the terms “unit” or “control unit” included in the nomenclature are commonly used to name controllers that are responsible for controlling specific functions of a vehicle and do not necessarily refer to a generic function unit. For example, each controller may include a communication device communicating with another controller or sensor to control a function in charge, a memory that stores operating system or logic instructions and input/output information, and one or more processors for determination, operation, and decision-making necessary for functions in charge.

Figure 1:
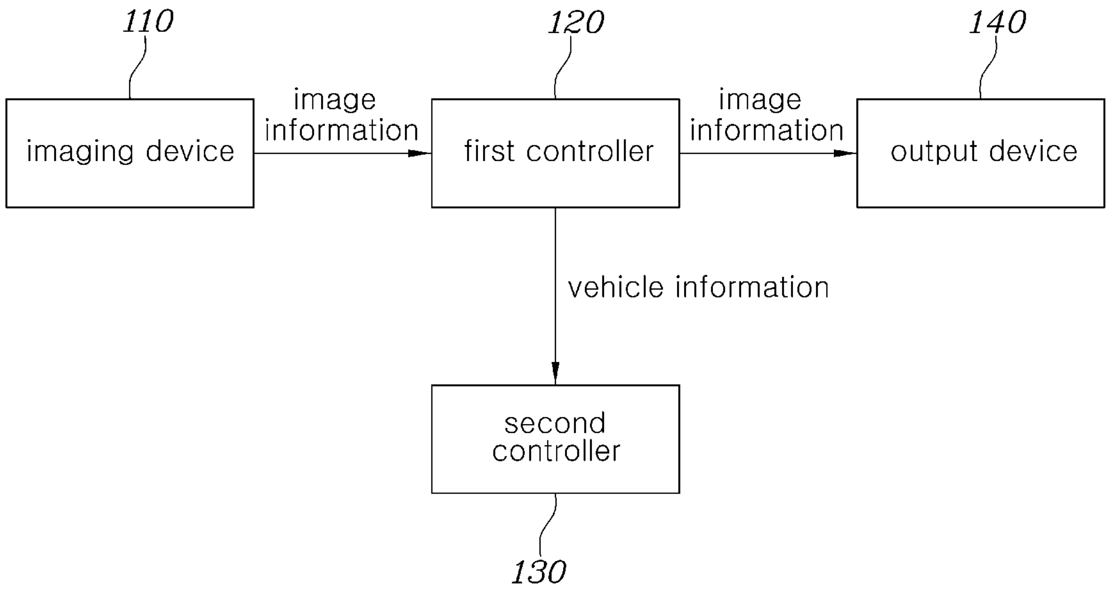
FIG. 1 is a block diagram illustrating a configuration of an image correction system according to an embodiment of the present disclosure.

First, a description is made of the configuration of the image correction system according to an embodiment with reference to FIG. 1.

FIG. 1 is a block diagram illustrating a configuration of an image correction system according to an embodiment of the present disclosure.

With reference to FIG. 1, the image correction system according to the present disclosure may include an imaging device 110, a first controller 120, a second controller 130, and an output device 140. FIG. 1 shows the components related to an embodiment of the present disclosure, and it is obvious that the image correction system may include more or fewer components in actual implementation.

Hereinafter, each component will be described.

The imaging device 110 may be installed on a vehicle during factory delivery or as needed by the driver during the use of the vehicle. The imaging device 110 may refer to a camera installed on the vehicle, and depending on the installed position, it may be at least one of a front camera, a side camera, or a rear camera. That is, in the image correction system, the imaging device 110 may be installed in multiple quantities instead of just a single imaging device as shown in FIG. 1. In addition, the imaging device 110 may capture the surroundings of the vehicle and provide the captured images to the first controller 120.

The first controller 120 may analyze and correct image information based on the captured images provided by the imaging device 110. As the imaging device 110 installed on the vehicle is composed of a camera as described above, it includes a lens. The image captured by the imaging device 110 may be distorted by the lens, and such distortion may cause inconvenience for the driver to recognize the captured image. Therefore, when the imaging device 110 is initially installed on the vehicle, the initial correction value may be set by correcting the offset and distortion caused by the installation of the imaging device 110 in the image captured by the imaging device 110. The initial correction value may be set through the image correction method described in the present disclosure or conventional image correction methods that utilize markers displayed on a known floor.

However, the position of the imaging device 110 may change due to shocks applied to the vehicle while the vehicle is in motion, replacement of the imaging device 110, or new installation, causing variations (e.g., displacement or distortion) between the mounting position of the imaging device 110 and the initial mounting position. Such a change in the mounting position of the imaging device 110 may cause an offset in the imaging device, and the error or distortion that arises due to the change may not be fully corrected even when the initial correction value is applied to the image captured by the imaging device 110.

When an offset occurs in the imaging device 110 due to various external factors, a new correction value for the image may be set during the vehicle's operation via the first controller 120. A detailed description thereof will be made later.

The second controller 130 may provide the first controller 120 with information necessary for analyzing and correcting the image. For example, the second controller 130 may collect at least one of the vehicle speed and steering information during the vehicle operation as vehicle information and provide the collected vehicle information to the first controller 120 to analyze and correct the image. However, this is just an example, and the second controller 130 may collect various vehicle information and may not provide the collected information to the first controller 120 when the first controller 120 does not require vehicle information.

The output device 140 may receive and output the image captured by the imaging device 110 or the corrected image obtained by correcting the captured image via the first controller 120. For example, the output device 140 may be a display device that may visually output the image captured by the imaging device 110 in the vehicle. The display device may be implemented as a display of a cluster or an Audio, Video, and Navigation (AVN) system. However, this is just an example, and the captured image may be displayed to the driver through the output device 140 implemented in various ways other than those mentioned above.

With reference to FIG. 1, the components constituting the image correction system of the present disclosure may communicate signals through a predetermined communication link complying with a predetermined vehicle communication protocol. For example, the imaging device 110, the first controller 120, and the output device 140 may communicate image signals using a communication link based on the low voltage differential signaling (LVDS), and the first controller 120 and the second controller 130 may communicate the vehicle information using a communication link based on the Controller Area Network (CAN) protocol.

The first controller 120 may be implemented as one of the functions of the AVN controller that controls the AVN system installed in the vehicle. However, this is just an example and is not necessarily limited thereto. For instance, the first controller 120 can be implemented as a separate controller from the AVN controller or as a distributed form whose functions are spread across two or more different controllers.

In addition, the second controller 130 that provide vehicle information to the first controller 120 may be implemented as one of the functions of the vehicle communication control unit (CCU) installed in the vehicle. However, this is just an example and is not necessarily limited thereto. For example, the second controller 130 may be implemented such that its function is performed by the first controller 120 or the vehicle information is transmitted to the first controller 120 via sensors or devices installed in the vehicle.

Hereinafter, a description is made of the first controller 120 which performs image correction with reference to FIG. 2.

Figure 2:
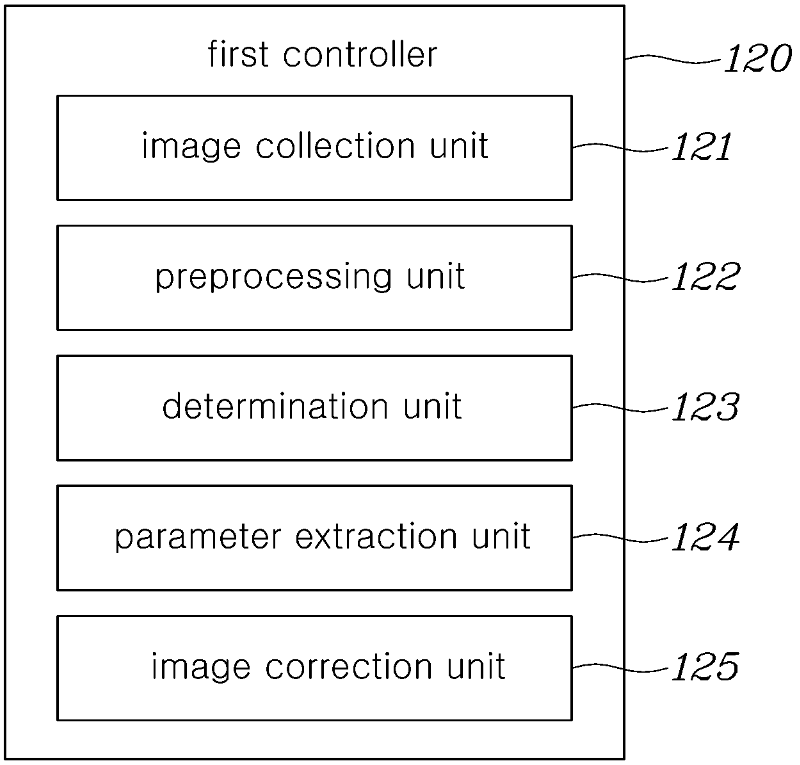
FIG. 2 is a block diagram illustrating a configuration of a controller for correcting images captured by an imaging device according to an embodiment of the present disclosure.

FIG. 2 is a block diagram illustrating a configuration of a controller for correcting images captured by an imaging device according to an embodiment of the present disclosure.

With reference to FIG. 2, the first controller 120 for performing image correction on the image captured by the imaging device 110 according to the present disclosure may include an image collection unit 121, a preprocessing unit 122, a determination unit 123, a parameter extraction unit 124, and an image correction unit 125. Hereinafter, each component will be described.

The image collection unit 121 may collect images captured by the imaging device 110, and the images may be captured at different time points. The image collection unit 121 may transmit the collected images to the preprocessing unit 122.

The preprocessing unit 122 may transform the plurality of images captured at different time points into a pyramid image or partial images showing parts thereof. The images collected through the image collection unit 121 are large in size, and this means that direct image correction with the collected images may cause an error or correction delay due to excessive information being processed. Accordingly, the images captured through the preprocessing unit 122 may be reduced in size or cropped into necessary portions to be used.

As an example, the image correction system of the present disclosure may use optical flow to correct the offset in the imaging device 110 even while the vehicle is in motion. When using optical flow, it may be necessary to select a certain time point and compare an image corresponding to the selected time point with an image corresponding to the next time point after the selected time point. To this end, the determination unit 123 may receive the image transformed through the preprocessing unit 122 and determine a plurality of feature points in the first image captured at the first time point among the plurality of provided images. The determination unit 123 may determine a plurality of feature points using at least one of the cracks and patterns appearing on the road surface contained in the first image.

Also, the determination unit 123 may detect corresponding points matching the plurality of feature points in a second image captured at the second time point following the first time point among the plurality of images. In particular, the determination unit 123 may determine whether the number of the corresponding points respectively matching the feature points is equal to or greater than a predetermined number. The determination unit 123 may detect a corresponding point for each of the plurality of feature points in the second image until a predetermined number of corresponding points are detected. The predetermined number may refer to a minimum number required to use the plurality of feature points and corresponding points matching the plurality of feature points. In addition, the determination unit 123 may receive at least one of vehicle speed and steering information from the second controller 130 as vehicle information and detect corresponding points respectively matching the plurality of feature points in the second image captured at the second point based on the vehicle information.

The determination unit 123 may provide information on the plurality of feature points and the plurality of corresponding points matching the plurality of feature points to the parameter extraction unit 124.

The parameter extraction unit 124 may determine the movement information of multiple feature points based on the corresponding points detection result and the plurality of feature points and may determine a correction parameter based on the movement information. In detail, when the number of the corresponding points detected by the determination unit 123 in the second image is equal to or greater than the predetermined number, the parameter extraction unit 124 may determine the movement information based on the coordinates of feature points respectively matching the detected corresponding points among the plurality of feature points and the coordinates of the plurality of detected corresponding points. The parameter extraction unit 124 may determine a motion vector using pairs of the coordinates of the feature points respectively matching the plurality of detected corresponding points and the coordinates of the plurality of detected corresponding points and determining the movement information of the plurality of feature points based on the motion vector.

In addition, the parameter extraction unit 124 may derive a homography based on the movement information and determine the correction parameter using the components of the derived homography. For simplicity of explanation, it is assumed hereinafter that there are four pairs of the coordinates of the feature points respectively matching the plurality of detected corresponding points and the coordinates of the plurality of detected corresponding points.

The parameter extraction unit 124 may derive a homography using four pairs of the coordinates of the plurality of feature points and the coordinates of the plurality of corresponding points. The homography may be derived in the form of 3 by 3 matrix, and assuming the column vectors of the derived homography are R1, R2, and R3, the movement of the imaging device 110 may be expressed as [Xt, Yt, Zt] with the same components as R3 among the column vectors, and the rotation of the imaging device 110 may be expressed as a 3 by 3 matrix having the components of [R1, R2, R1×R2] using R1 and R2 among the column vectors. Here, × refers to the cross product of vectors. That is, the parameter extraction unit 124 may determine coordinates for movement of the imaging device 110 and a matrix for rotation of the imaging device 110 in homography, which may be determined as correction parameters.

Afterward, the parameter extraction unit 124 may provide the image correction unit 125 with the correction parameters determined using the derived homography.

The image correction unit 125 may perform correction of an image captured by the imaging device 110 based on the correction parameters provided by the parameter extraction unit 124.

In detail, the image correction unit 125 may convert coordinates of the plurality of feature points respectively matching the plurality of detected corresponding points into coordinates of a world coordinate system and a camera coordinate system and express converted coordinates accordingly. For example, when the coordinates of one of the plurality of feature points are converted to be expressed as [Xw, Yw, Zw] in the world coordinate system and [Xc, Yc, Zc] in the camera coordinate system, the image correction unit 125 may convert the coordinates of the feature points in the world coordinate system into the coordinates in the camera coordinate system using Equation 1.

$$[Xc,Yc,Zc]=R^{-1}([Xw,Yw,Zw]-[Xt,Yt,Zt])$$ Equation 1 where, R denotes a matrix for rotation of the imaging device 110 among correction parameters, and $R^{-1}$ denotes an inverse matrix of the above matrix. The image correction unit 125 may convert the coordinates [Xc, Yc, Zc] in the camera coordinate system into the coordinates of the feature point in the first image through Equation 2.

$$[x,y]=\left[\left(fx*\frac{Xc}{Zc}\right)+ux,\left(fy*\frac{Yc}{Zc}\right)+uy\right]$$ Equation 2 where [x, y] denotes the converted coordinates of feature points in the first image, fx and fy may denote a focal length as an intrinsic value of the imaging device 110, and ux and uy may denote a principle point as an intrinsic value of the imaging device 110.

The image correction unit 125 may perform image correction of the imaging device 110 using the converted coordinates of the feature points in the first image derived through the above process and the coordinates of the feature points in the existing first image. Although the above description has been made with a single feature point for the convenience of explanation, the same process may equally be applied to each of the plurality of feature points included in the first image.

The first controller 120 according to an embodiment of the present disclosure may perform image correction to correct an error or distortion of an image, which is caused by the offset of the imaging device 110, using only the images obtained through the imaging device 110 while the vehicle is in motion. As a result, it is possible to correct the error or distortion of the image captured by the imaging device 110 without time and space restrictions, and to provide a highly consistent image to the driver.

Hereinafter, a description is made of the image correction method according to an embodiment with reference to FIG. 3 based on the configuration of the image correction system described with reference to FIGS. 1 and 2.

Figure 3:
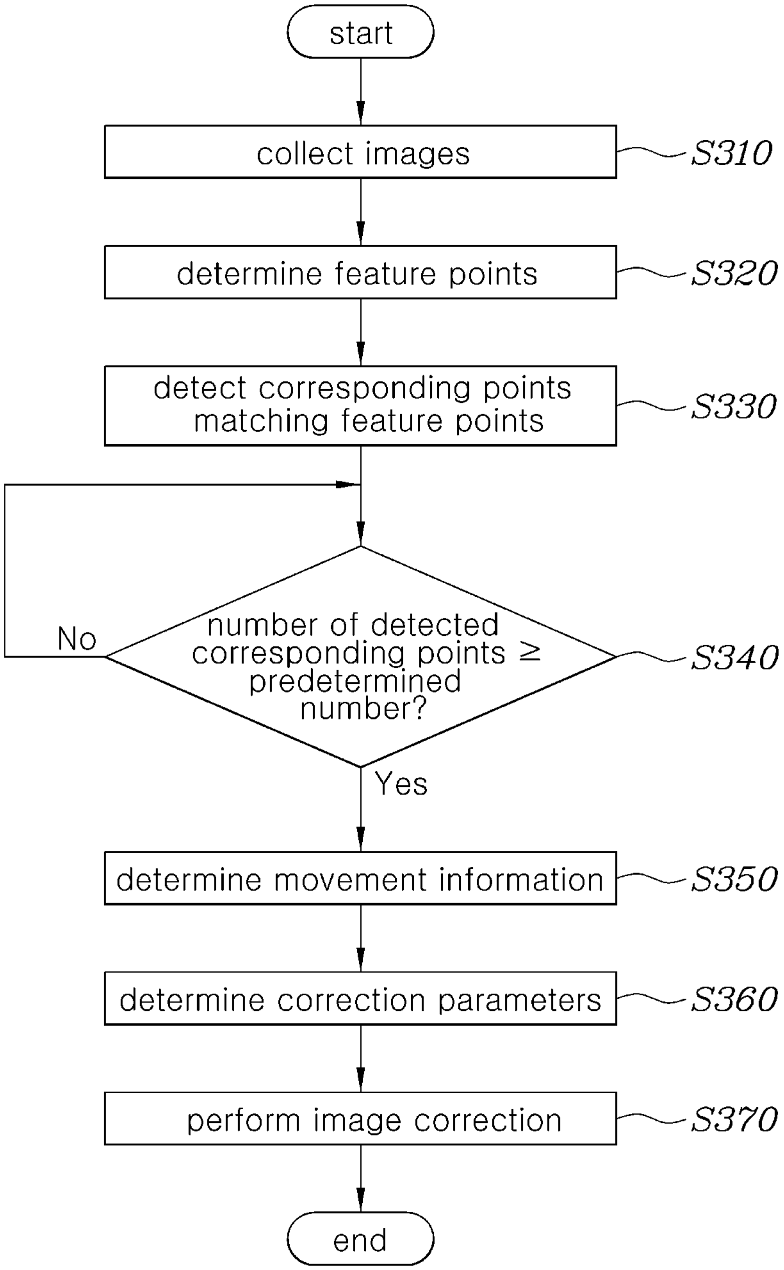
FIG. 3 is a flowchart of an image correction method according to an embodiment of the present disclosure.

FIG. 3 is a flowchart of an image correction method according to an embodiment of the present disclosure.

With reference to FIG. 3, the first controller 120 may collect, at step S310, a plurality of images captured through the imaging device 110 installed in the vehicle. The first controller 120 may determine, at step S320, multiple feature points in the first image captured at the first time point among the plurality of collected images.

Next, the first controller 120 may detect, at step S330, corresponding points in a second image captured at the second time point following the first time point, which respectively match the plurality of previously determined feature points. Here, when the number of detected corresponding points is less than a predetermined number (No at step S340), the first controller 120 may continue to detect corresponding points until the number of detected corresponding points is equal to or greater than the predetermined number.

When the number of corresponding points detected in the second image is equal to or greater than the predetermined number (Yes at step S340), the first controller 120 may determine, at step S350, the movement information of the plurality of feature points based on the plurality of feature points and the corresponding points corresponding thereto.

The first controller 120 may derive a homography based on the determined movement information and determine the correction parameter based on the components of the homography at step S360. Next, the first controller 120 may perform image correction at step S370 in such a way as to determine the coordinates corresponding to the plurality of feature points in the first image using the determined correction parameters and correct images captured by the imaging device 110 based thereon.

Although the present disclosure has been illustrated and described in connection with specific embodiments, it will be obvious to those skilled in the art that various modifications and changes can be made thereto without departing from the spirit of the disclosure or the scope of the appended claims.

Meanwhile, the present disclosure described above may be implemented as computer-readable codes on a medium on which a program is recorded. Computer-readable media include all types of recording devices in which data readable by a computer system are stored. Examples of the computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as restrictive in all respects but as exemplary. The scope of the present disclosure should be determined by a reasonable interpretation of the appended claims and includes all modifications within the equivalent scope of the present disclosure.

What is claimed is:

1. An image correction method comprising:

collecting a plurality of images captured at different time points by an imaging device installed in a vehicle;

determining a plurality of feature points in a first image captured at a first time point among the plurality of images;

detecting corresponding points respectively matching the plurality of feature points in a second image captured at a second time point among the plurality of images, wherein detecting corresponding points includes:

determining whether a number of detected corresponding points in the second image is less than a predetermined number;

continuing to detect corresponding points for remaining unmatched feature points among the plurality of feature points if the number of the detected corresponding points in the second image is less than the predetermined number; and detecting a corresponding point for each of the plurality of feature points until the predetermined number of corresponding points are detected in the second image;

determining movement information of the plurality of feature points based on the plurality of feature points and a result of the detecting;

determining a correction parameter based on the movement information; and performing image correction based on the correction parameter.

2. The image correction method of claim 1, wherein the collecting of the plurality of images comprises transforming the plurality of images captured at different time points into pyramid images or partial images showing parts thereof.

3. The image correction method of claim 1, wherein the determining of the plurality of feature points comprises determining the plurality of feature points using at least one of a crack and a pattern appearing on a road surface contained in the first image.

4. The image correction method of claim 1, wherein the detecting of the corresponding points comprises:

collecting at least one of vehicle speed and steering information as vehicle information; and detecting a corresponding point for each of the plurality of feature points in the second image captured at the second time point based on the collected vehicle information.

5. The image correction method of claim 1, wherein the determining of the movement information comprises determining, in response to the number of the detected corresponding points in the second image being equal to or greater than the predetermined number, the movement information based on coordinates of feature points respectively matching the detected corresponding points among the plurality of feature points and coordinates of the detected corresponding points.

6. The image correction method of claim 5, wherein the determining of the movement information comprises:

determining a motion vector using pairs of the coordinates of the feature points respectively matching the plurality of detected corresponding points and the coordinates of the plurality of detected corresponding points; and determining the movement information of the plurality of feature points based on the motion vector.

7. The image correction method of claim 1, wherein the determining of the correction parameter comprises:

deriving a homography based on the movement information; and determining the correction parameter using a component of the derived homography.

8. The image correction method of claim 7, wherein the performing of the image correction comprises:

converting coordinates of the plurality of feature points into coordinates of a world coordinate system and a camera coordinate system using the correction parameter; and correcting images captured by the imaging device based on the converted coordinates.

9. An image correction system comprising:

an imaging device adapted to be installed in a vehicle; and a first controller configured to collect a plurality of images captured at different time points by the imaging device, determine a plurality of feature points in a first image captured at a first time point among the plurality of images, detect corresponding points respectively matching the plurality of feature points in a second image captured at a second time point among the plurality of images, determine movement information of the plurality of feature points based on the plurality of feature points and a result of detecting corresponding points, determine a correction parameter based on the movement information, and perform image correction based on the correction parameter, wherein the first controller is further configured to:

determine whether a number of detected corresponding points in the second image is less than a predetermined number, continue to detect corresponding points for remaining unmatched feature points among the plurality of feature points if the number of the detected corresponding points in the second image is less than the predetermined number, and detecting a corresponding point for each of the plurality of feature points until the predetermined number of corresponding points are detected in the second image.

10. The image correction system of claim 9, wherein the first controller is further configured to transform the plurality of images captured at different time points into pyramid images or partial images showing parts thereof.

11. The image correction system of claim 9, wherein the first controller is further configured to determine the plurality of feature points using at least one of a crack and a pattern appearing on a road surface contained in the first image.

12. The image correction system of claim 9, further comprising a second controller configured to collect at least one of vehicle speed and steering information as vehicle information, wherein the first controller is further configured to detect a corresponding point for each of the plurality of feature points in the second image captured at the second time point based on the collected vehicle information.

13. The image correction system of claim 9, wherein the first controller is further configured to determine, in response to the number of the detected corresponding points in the second image being equal to or greater than a predetermined number, the movement information based on coordinates of feature points respectively matching the detected corresponding points among the plurality of feature points and coordinates of the detected corresponding points.

14. The image correction system of claim 13, wherein the first controller is further configured to determine a motion vector using pairs of the coordinates of the feature points respectively matching the plurality of detected corresponding points and the coordinates of the plurality of detected corresponding points, and determine the movement information of the plurality of feature points based on the motion vector.

15. The image correction system of claim 9, wherein the first controller is further configured to derive a homography based on the movement information and determine the correction parameter using a component of the derived homography.

* * * * *